United States Patent [19]  
Dix et al.

[11] Patent Number: 4,976,744
[45] Date of Patent: Dec. 11, 1990

[54] PREPARATION OF CONCENTRATED SOLUTIONS OF CATIONIC DYES AS MONO-CARBOXYLATES IN GLYCOL ETHER

[75] Inventors: Johannes P. Dix, Neuhofen; Guenter Hansen, Ludwigshafen; Hellmut Kast, Bobenheim-Boxheim, all of Fed. Rep. of Germany

[73] Assignee: BASF Aktiengesellschaft, Ludwigshafen, Fed. Rep. of Germany

[21] Appl. No.: 406,244

[22] Filed: Sep. 12, 1989

[30] Foreign Application Priority Data

Sep. 30, 1988 [DE] Fed. Rep. of Germany ....... 3833195

[51] Int. Cl.$^5$ ........................ C09B 67/34; C09B 69/06
[52] U.S. Cl. ........................................... 8/527; 8/538; 8/594; 8/654; 8/657; 8/659; 8/609; 8/610; 8/611; 8/927
[58] Field of Search .................. 8/654, 658, 657, 659, 8/527, 594

[56] References Cited

U.S. PATENT DOCUMENTS

| | | | |
|---|---|---|---|
| 4,095,943 | 6/1978 | Lang et al. | 8/541 |
| 4,245,990 | 1/1981 | Loew et al. | 8/582 |
| 4,306,875 | 12/1981 | De Feo et al. | 8/471 |
| 4,767,421 | 8/1988 | Van der Veen et al. | 8/523 |

FOREIGN PATENT DOCUMENTS 975758 11/1982 U.S.S.R.

OTHER PUBLICATIONS

K. Venkataraman, The Chemistry of Synthetic Dyes, vol. 4, Chap. 3 to 5, Academic Press, N.Y., 1971.

Primary Examiner—A. Lionel Clingman
Attorney, Agent, or Firm—Oblon, Spivak, McClelland, Maier & Neustadt

[57] ABSTRACT

Concentrated solutions of cationic dyes are prepared by treating the cationic dyes, which contain as the counterions the anions customarily present during their preparation, with alkali metal salts of monocarboxylic acids and with or without complexing agents in an aqueous glycol ether medium, and separating off the organic phase, which contains the dyes in the form of their monocarboxylic acid salts.

4 Claims, No Drawings

PREPARATION OF CONCENTRATED SOLUTIONS OF CATIONIC DYES AS MONO-CARBOXYLATES IN GLYCOL ETHER

The present invention relates to a novel process for preparing a concentrated solution of a cationic dye by treating the cationic dye, which contains as the counterion the anion customarily present during its preparation, with an alkali metal salt of monocarboxylic acid and with or without a complexing agent in an aqueous glycol ether medium, and separating off the organic phase, which contains the dye in the form of its monocarboxylic acid salt.

Cationic dyes for the purposes of the present invention are for example the compounds listed in the Colour Index as basic dyes, the dyes described in K. Venkataraman, The Chemistry of Synthetic Dyes, vol. 4, chp. 3 to 5, Academic Press, New York, 1971, and the numerous dyes with a cationic group described in the patent literature.

Such dyes are for example members of the class of monoazo or polyazo dyes, anthraquinone dyes, diphenylmethane dyes, triphenylmethane dyes, xanthene dyes, pyrylium dyes, acridine dyes, azine dyes, oxazine dyes, thiazine dyes, cyanine dyes or naphthostyryl dyes.

In the course of their preparation, basic dyes are customarily obtained in the form of their chlorides, sulfates, methosulfates, ethoslfates, amidosulfates, p-toluenesulfonates, oxalates, nitrates, phosphates or tetrachlorozincates.

In most cases, however, cationic dyes which contain the counterions mentioned are unsuitable for preparing concentrated dye solutions. But replacement of the counterions mentioned for better solubilizing anions generally necessitates the involvement of the bases underlying the cationic dyes. These dye bases are frequently unstable.

It is an object of the present invention to provide a novel process whereby it should be possible to prepare concentrated solutions of cationic dyes in a simple manner without having to pass through the intermediate stage of the dyes base.

We have found that this object is achieved by treating the cationic dye, which contains as the counterion the anion customarily present during its preparation, with an alkali metal salt of a monocarboxylic acid and with or without a complexing agent in a reaction medium containing water and a glycol ether, and separating off the organic phase, which contains the cationic dye in the form of its monocarboxylic acid salt.

Suitable glycol ethers for use in the process according to the invention are in particular those which are not completely miscible with salt-containing water. Examples are $C_1$–$C_4$-monoalkyl ethers of ethylene glycol or 1,2-propylene glycol, such as ethylene glycol monomethyl, monoethyl, monopropyl or monobutyl ether, 1-methoxy-2-propanol, 1-ethoxy-2-propanol, 1-propoxy-2propanol or butoxy-2-propanol, and ethylene glycol monophenyl ether.

The use of ethylene glycol monobutyl ether is preferred.

Suitable alkali metal salts of monocarboxylic acids are for example the respective lithium, sodium and potassium salts, the use of the potassium salt and in particular of the sodium salt being preferred. A suitable monocarboxylic acid upon which to base the alkali metal salt is for example benzoic acid or any $C_1$–$C_{10}$-alkanoic acid, which may be substituted by phenyl, such as a formic acid, acetic acid, propionic acid, butyric acid, pentanoic acid, hexanoic acid, heptanoic acid, octanoic acid, 2-ethylhexanoic acid, nonanoic acid, decanoic acid or phenyl acetic acid.

The use of an alkali metal salt of formic acid, acetic acid, propionic acid, butyric acid, hexanoic acid, 2-ethylhexanoic acid, phenyl acetic acid or benzoic acid is preferred. The use of an alkali metal formate is particularly preferred.

If the cationic dye contains as the counterion a metal-containing cation, for example tetrachlorozincate, it is of advantage to add to the reaction medium in addition a complexing agent, for example nitrilotriacetic acid or ethylenediaminetetraacetic acid. The acids mentioned are preferably used in the form of their alkali metal salts, in particular their disodium salt.

Per mole of cationic dye it is customary to add from 20 to 60 moles, preferably from 30 to 50 moles, of an alkali metal salt of a monocarboxylic acid and optionally from 1.1 to 1.3 moles of a complexing agent.

The amount of glycol ether is in general from 50 to 200% by weight, preferably from 70 to 110% by weight, based on the weight of cationic dye. Water is customarily used in an amount of from 300 to 800% by weight, preferably from 400 to 600% by weight, based on the weight of cationic dye.

The process according to the invention is advantageously carried out by stirring the press cake of the cationic dye in the form in which it is obtained in production into a very concentrated solution of an alkali metal salt of a monocarboxylic acid, then adding the glycol ether with or without addition of water and with or without a complexing agent, and stirring the mixture at room temperature. Heating is not necessary to effect the exchange, but may be advantageous in some cases. Phase separation takes place virtually at once. After the aqueous phase has been separated off, the organic phase, which contains the cationic dye, may be washed with a concentrated solution of the monocarboxylic acid alkali metal salt. It is surprisingly possible in this way to obtain substantial or virtually complete removal of the counterion originally present without having to pass through the intermediate stage of the dye base.

After the glycol ether phase, which contains the cationic dye in the form of its monocarboxylic acid salt, has been separated off and possibly washed, the cationic dye will in general already be in the form of a stable, highly concentrated solution which may of course be standardized to standard strengths or a certain pH by further additions, such as solvents or acids. A particularly suitable way of controlling the pH is formic acid.

The solution prepared according to the invention is suitable for any purpose where liquid formulations are desirable. It is suitable in particular for the gel dyeing of acrylonitrile polymers.

The Examples which follow will illustrate the invention in more detail.

EXAMPLE 1

121 g of the 90% strength by weight dye of the formula

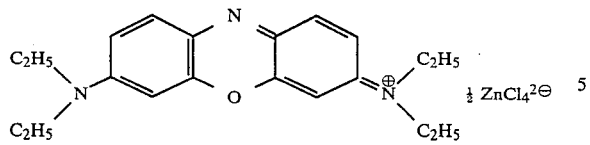

were added in a ground form to a mixture of 739 g of 42.5% strength by weight sodium formation solution, 49 g of the sodium salt of nitrilotriacetic acid (90% strength by weight), 108 g of ethylene glycol monobutyl ether and 57 ml of water, and the mixture was stirred in a separating funnel at room temperature for 3.5 hours. After standing for one hour, the lower, aqueous layer was run off, leaving as the upper layer 243 g of the dye formate dissolved in ethylene glycol monobutyl ether.

EXAMPLE 2

89 g of the dried and ground dye of the formula

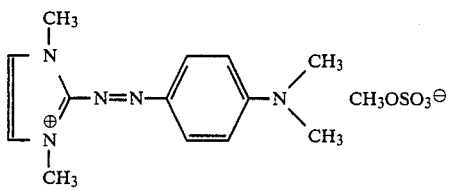

were added to a mixture of 110 g of 1-methoxy-2-propanol, 700 g of aqueous sodium formate solution (42% strength by weight) and 50 ml of water and treated as described in Example 1, affording 220 g the dye formate dissolved

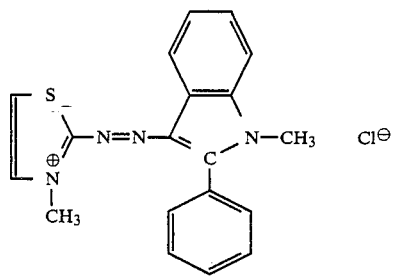

were added to a mixture of 115 g of ethylene glycol monophenyl ether, 500 g of the sodium salt of 2-ethylhexanoic acid (in the form of a saturated aqueous solution) and 40 ml of water. The treatment described in Example 1 was applied, leaving 255 g of the ethylhexanoate of the dye in solution in ethylene glycol monophenyl ether.

EXAMPLE 4

89 g of the dye of the formula

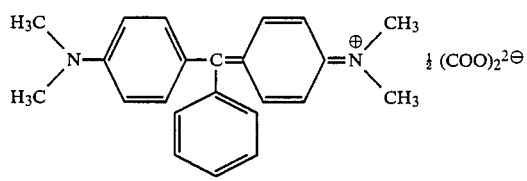

were added to a mixture of 110 g of ethylene glycol monobutyl ether and 700 g of a saturated aqueous solution of sodium propionate. A workup as described in Example 1 gave 220 g of a concentrated dye solution with the dye present in the form of the propionate.

EXAMPLE 5

125 g of the dye of the formula

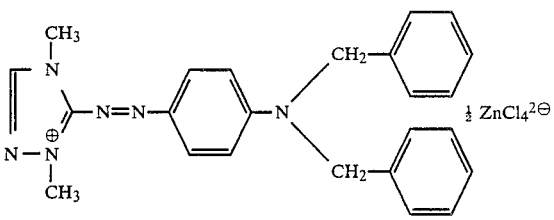

were added to a mixture of 130 g of ethylene glycol monoethylene ether, 800 g of 45% strength by weight aqueous sodium acetate solution, 54 g of the sodium salt of ethylenediaminetetraacetic acid and 500 ml of water. A treatment as described in Example 1 gave 264 g of concentrated dye solution with the dye pesent as acetate.

EXAMPLE 108 g of the dye of the formula

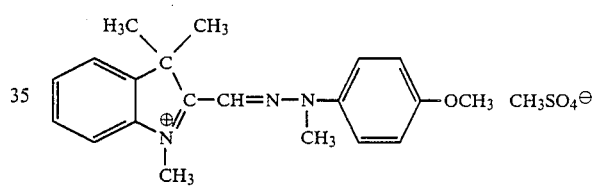

were added to a mixture of 120 g of 1-methoxy-2-propanol and 950 g of 36% strength by weight aqueous sodium benzoate solution. The treatment as described in Example 1 gave 248 g of organic phase containing the dye as benzoate.

EXAMPLE 7

129 g of the dye of the formula

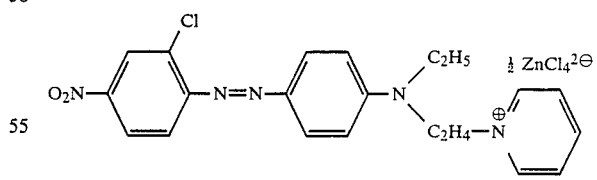

were added to a mixture of 110 g of ethylene glycol monobutyl ether, 800 g of a saturated aqueous sodium propionate solution, 54 g of the sodium salt of ethylenediaminetetraacetic acid and 60 ml of water. The treatment as described in Example 1 gave 264 g of organic phase containing the dye as propionate.

EXAMPLE 8

109 g of the dye of the formula

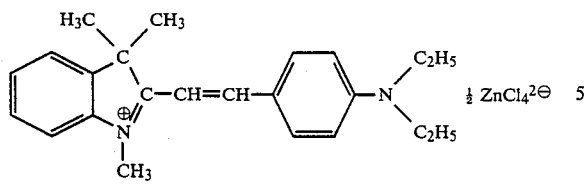 ½ ZnCl₄²⁻

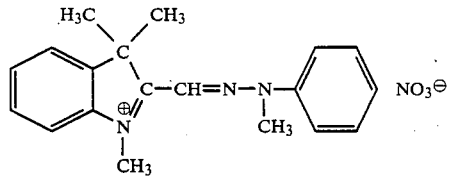 NO₃⁻ were added to a mixture of 120 g of 1-methoxy-2-propanol, 730 g of 42.5% strength by weight aqueous sodium formate solution, 49 g of the sodium salt of nitrilotriacetic acid (90% by weight) and 60 ml of water. Reaction and working up as described in Example 1 gave 245 g of a solution containing the dye as formate.

EXAMPLE 9

89 g of the dye of the formula were added to a mixture of 110 g of ethylene glycol monobutyl ether and 750 g of a saturated aqueous solution of the sodium salt of 2-ethylhexanoic acid. The treatment as described in Example 1 gave 214 g of concentrated dye solution with the dye present as 2-ethylhexanoate.

The method of Example 1 also gives the dyes listed in the following Table:

| Example No. | Dye cation | Dye anion | Solvent |
|---|---|---|---|
| 10 | (structure: imidazole-N(CH₃)-N⁺(CH₃)=... -N=N- 2-phenyl-1-methylindole) | HCOO⁻ | Ethylene glycol monobutyl ether |
| 11 | (structure: phenyl-N=N-phenyl-N=N- pyridone with N⁺-pyridinium, CH₃, HO, NH, =O) | phenyl-COO⁻ | 1-Methoxy-2-propanol |
| 12 | (structure: imidazole-N(CH₃)-N⁺(CH₃)=... -N=N-C₆H₄-N(CH₃)(CH₂-phenyl)) | HCOO⁻ | Ethylene glycol monobutyl ether |
| 13 | (structure: Cl-C₆H₃(-N=N-C₆H₄-N(C₂H₅)₂)-N(CH₃)=N⁺=N(CH₃)) | CH₃COO⁻ | Ethylene glycol monobutyl ether |
| 14 | (structure: H₅C₆-thiadiazole-N=N-C₆H₄-N(C₂H₅)(CH₂-CH₂-N⁺-pyridinium)) | HCOO⁻ | 1-Methoxy-2-propanol |

-continued

| Example No. | Dye cation | Dye anion | Solvent |
|---|---|---|---|
| 15 | (structure: dimethylaminomethylene-substituted chlorophenyl azo diethyl-hydroxyethylaminophenyl) | $C_2H_5COO^\ominus$ | Ethylene glycol monobutyl ether |
| 16 | (structure: N-methylpyridinium azo dimethylaminophenyl) | $HCOO^\ominus$ | 1-Methoxy-2-propanol |
| 17 | (structure: 3-methyl-6-methoxy-benzothiazolium azo dimethylaminophenyl) | $HCOO^\ominus$ | Ethylene glycol monobutyl ether |
| 18 | (structure: dipropylamino-thiocarbonyl hydrazono methylammonium azo diethylaminophenyl) | $HCOO^\ominus$ | Ethylene glycol monobutyl ether |
| 19 | (structure: 1-(3-trimethylammoniopropylamino)-4-hydroxyanthraquinone) | $HCOO^\ominus$ | Ethylene glycol monobutyl ether |
| 20 | (structure: 1,3,3-trimethylindolinium-vinyl-amino-2-methylbenzothiazole) | $CH_3COO^\ominus$ | 1-Methoxy-2-propanol |
| 21 | (structure: benzothiazole-azo-methine-1,3-dimethylbenzimidazolium) | $HCOO^\ominus$ | Ethylene glycol monobutyl ether |
| 22 | (structure: N-methyl-N-phenylhydrazono methyl-1,3-dimethyl-uracilium) | $HCOO^\ominus$ | Ethylene glycol monobutyl ether |

-continued

| Example No. | Dye cation | Dye anion | Solvent |
|---|---|---|---|
| 23 | ![structure: 8-(N,N-diethylimino)-bromonaphthalene linked to 4-(N,N-diethylamino)phenyl] H$_5$C$_2$–N$^\oplus$=C, with C$_2$H$_5$ groups, Br substituent on naphthalene, and p-N(C$_2$H$_5$)$_2$ phenyl | HCOO$^\ominus$ | Ethylene glycol monobutyl ether |

We claim:

1. A process for preparing a concentrated solution of cationic dye, which comprises treating the cationic dye, which contains as the counterion the anion customarily present during its preparation, with an alkali metal salt of a monocarboxylic acid and with or without a complexing agent in a reaction medium containing water and a glycol ether which is not completely miscible with salt containing water, and separating off the organic phase, which contains the cationic dye in the form of its monocarboxylic acid salt.

2. A process as claimed in claim 1, wherein a complexing agent is additionally added to the reaction medium if the cationic dye contains a metal-containing counterion.

3. A process according to claim 1, wherein the glycol ether is selected from the group consisting of $C_1$–$C_4$-monoalkyl ethers of ethylene glycol, $C_1$–$C_4$-monoalkyl ethers of 1,2-proplyene glycol, and ethylene glycol monohenyl ether.

4. A process according to claim 2, wherein the complexing agent is selected from the group consisting of nitrilotriacetic acid, ethylenediaminetetraacetic acid and alkali metal salts thereof.

* * * * *